(12) United States Patent
Brown et al.

(10) Patent No.: US 8,341,444 B2
(45) Date of Patent: Dec. 25, 2012

(54) MINIMIZATION OF POWER CONSUMPTION IN SERVER ENVIRONMENT

(75) Inventors: Deanna Brown, Queen Creek, AZ (US); Lourdes M. Gee, Tucson, AZ (US); Nhu T. Nguyen, Tuscon, AZ (US); Evan T. Webster, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 1354 days.

(21) Appl. No.: 12/028,901

(22) Filed: Feb. 11, 2008

(65) Prior Publication Data
US 2009/0204833 A1 Aug. 13, 2009

(51) Int. Cl.
*G06F 1/32* (2006.01)
(52) U.S. Cl. ....................................................... 713/323
(58) Field of Classification Search ................... 713/323
See application file for complete search history.

(56) References Cited

U.S. PATENT DOCUMENTS

| | | | |
|---|---|---|---|
| 5,954,820 A | 9/1999 | Hetzler | |
| 6,073,089 A * | 6/2000 | Baker et al. | 702/185 |
| 6,593,773 B2 | 7/2003 | Staszewski et al. | |
| 6,931,559 B2 | 8/2005 | Burns et al. | |
| 6,952,782 B2 * | 10/2005 | Staiger | 713/300 |
| 6,986,069 B2 * | 1/2006 | Oehler et al. | 713/320 |
| 7,346,787 B2 * | 3/2008 | Vaidya et al. | 713/300 |
| 2003/0056126 A1 | 3/2003 | O'Connor et al. | |
| 2006/0184287 A1 | 8/2006 | Belady et al. | |
| 2007/0088965 A1 | 4/2007 | Sperber et al. | |

* cited by examiner

*Primary Examiner* — Kim Huynh
*Assistant Examiner* — Eric Chang
(74) *Attorney, Agent, or Firm* — Griffiths & Seaton PLLC

(57) ABSTRACT

A method for minimizing power consumption in a computer server is provided. Collected data for an event is compared with an entry in a power consumption table. A power reduction mechanism is triggered if the collected data and the entry are within a specified range. The power consumption table is updated with the collected data if the collected data and the entry are not within the specified range.

21 Claims, 2 Drawing Sheets

MINIMIZATION OF POWER CONSUMPTION IN SERVER ENVIRONMENT

BACKGROUND OF THE INVENTION

1. Field of the Invention

The present invention relates in general to computers, and more particularly to a method, system, and computer program product for minimizing power consumption in a computer server environment.

2. Description of the Related Art

Computer server environments are common in today's society and found in a variety of settings. Server environments often include a number of individual processing or storage components. A number of processing or storage components may be integrated into a single server. Multiple servers may be coupled together and housed in a single chassis. In one example, these servers are configured in a "blade" form factor as "blade servers." Each server in a multiple server configuration has associated power requirements. The power requirements may change as processing speed or additional storage devices of the server are brought on-line or adjusted in some manner.

Unnecessary power consumption is common in many computer storage/server systems. This problem is common across the industry, being extremely crucial in complex environments. For example, it is not always necessary to have all the different blade servers running all the time. This configuration often leads to unnecessary power consumption because not all resources are being utilized all the time or at the same time.

SUMMARY OF THE INVENTION

A need exists for a system, method, and computer program product for minimizing power consumption in a computer server environment. In addition, a need exists for a system, method, and computer program product to manage power in a more efficient manner, especially when systems are idling. Accordingly, in one embodiment, by way of example only, a method for minimizing power consumption in a computer server is provided. Collected data for an event is compared with an entry in a power consumption table. A power reduction mechanism is triggered if the collected data and the entry are within a specified range. The power consumption table is updated with the collected data if the collected data and the entry are not within the specified range.

In another embodiment, again by way of example only, a system for minimizing power consumption in a computer server is provided. A controller is operable on the computer server. The controller is configured to compare collected data for an event with an entry in a power consumption table, trigger a power reduction mechanism if the collected data and the entry are within a specified range, and update the power consumption table with the collected data if the collected data and the entry are not within the specified range.

In still another embodiment, again by way of example only, a computer program product is provided for minimizing power consumption in a computer environment. The computer program product comprising a computer-readable storage medium having computer-readable program code portions stored therein. The computer-readable program code portions include a first executable portion for comparing collected data for an event with an entry in a power consumption table, a second executable portion for triggering a power reduction mechanism if the collected data and the entry are within a specified range, and a third executable portion for updating the power consumption table with the collected data if the collected data and the entry are not within the specified range.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
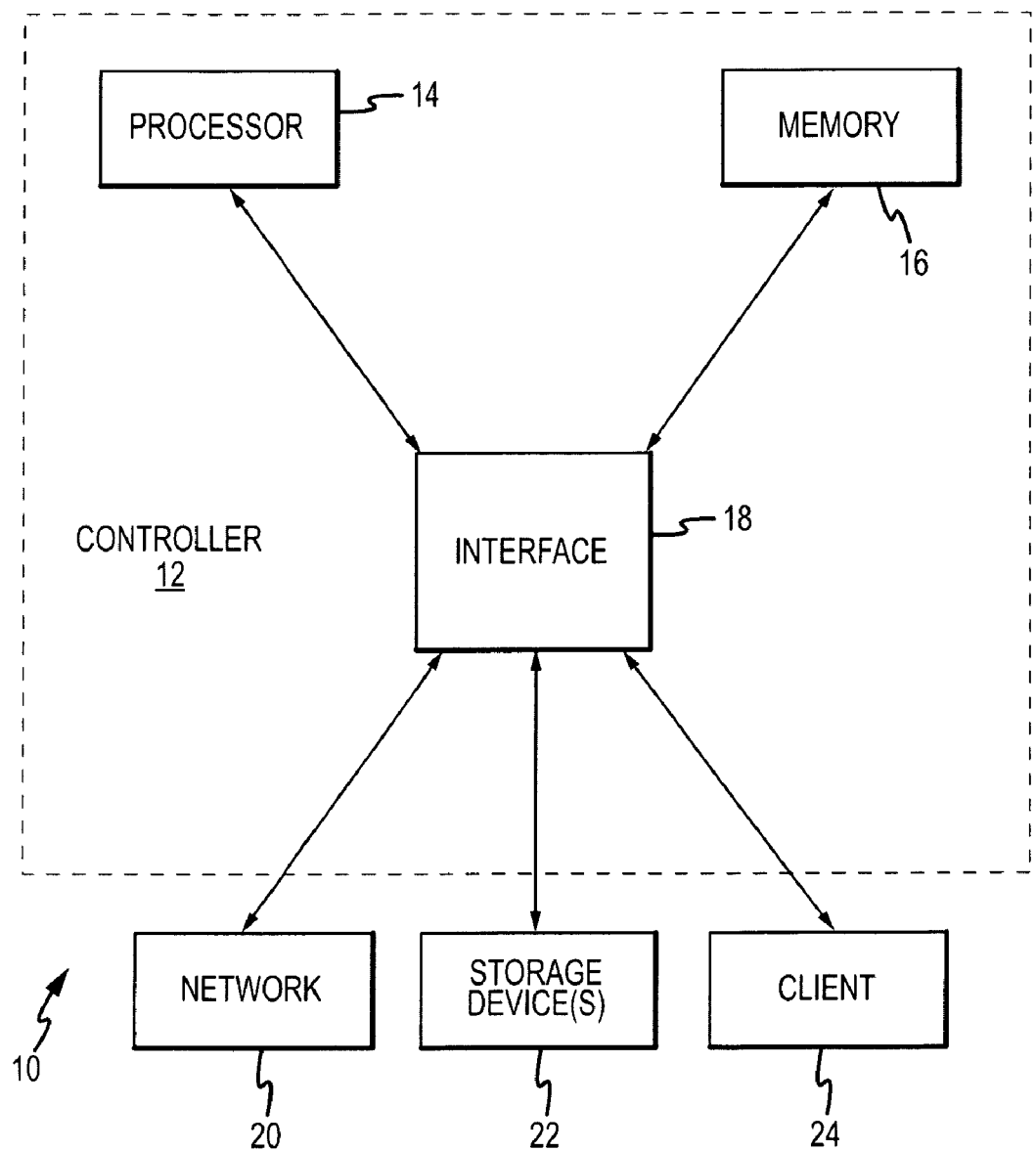
FIG. 1 depicts one embodiment of a computing environment to incorporate and use one or more aspects of the claimed subject matter.

Turning to FIG. 1, an exemplary computing environment 10 is depicted capable of incorporating and using one or more aspects of the following claimed subject matter. As one skilled in the art will appreciate, however, the depicted exemplary embodiment is only one representation of a variety of configurations in which one or more aspects of the claimed subject matter may be implemented.

Environment 10 includes a controller 12. Controller 12 may be operational on a computer server or affiliated with a computer storage subsystem. Controller 12 includes a processor 14 and memory 16. Processor 14 and memory 16 are coupled through an interface 18 to a network 20, one or more storage devices 22, and a client 24. A particular computer environment may include a number of controllers 12, each controller 12 responsible for a number of storage devices 22. Each controller 12 in such a computer environment may be responsible for the power requirements of a certain number of storage devices 22. Similarly, were storage devices 22 replaced with a number of processor devices, each controller 12 may be responsible for the power requirements of these processor devices. Processor 14 may execute software which may include a power reduction mechanism. This power reduction mechanism will be further described below.

The present description and following claimed subject matter refer to embodiments which address unnecessary power consumption in computer environments such as environment 10. These embodiments utilize a method which maximizes or minimizes power consumption as needed in a single or multi storage/server environment when necessary. This method allows for the power consumption of an environment to be monitored such that data collected can be used to best distribute power as necessary. As a result, power is not allocated in its maximum extent to a computer system that does not fully require it at a particular time.

Such a method may monitor computer workload over a period of time in order to make predictions of when power will be least consumed, for example. Based on these predictions, a power reduction mechanism, such as reducing processing/clock speeds, turning off processors or storage devices, etc., will be triggered.

For example, in a first iteration, a user may specify which data to monitor and collect. The data may be related to a particular operation being performed by the computer environment, such as processing or storage. This data may also include start times, end times, usage percentages, and durations for a particular component, or groups of components in a particular computer environment. Once the data is specified, the system may collect and analyze the data. Based on such data collection and analysis, a power consumption table may be constructed that anticipates what specific power consumption will take place for a particular computer environment at a particular time. The power consumption table may include a variety of fields relevant to a particular computer environment or application. For example, if the computer application to be monitored relates to processing usages, the power consumption table may include fields such as processor usage (for each processor in a particular environment) cross referenced against a particular duration of time.

Figure 2:
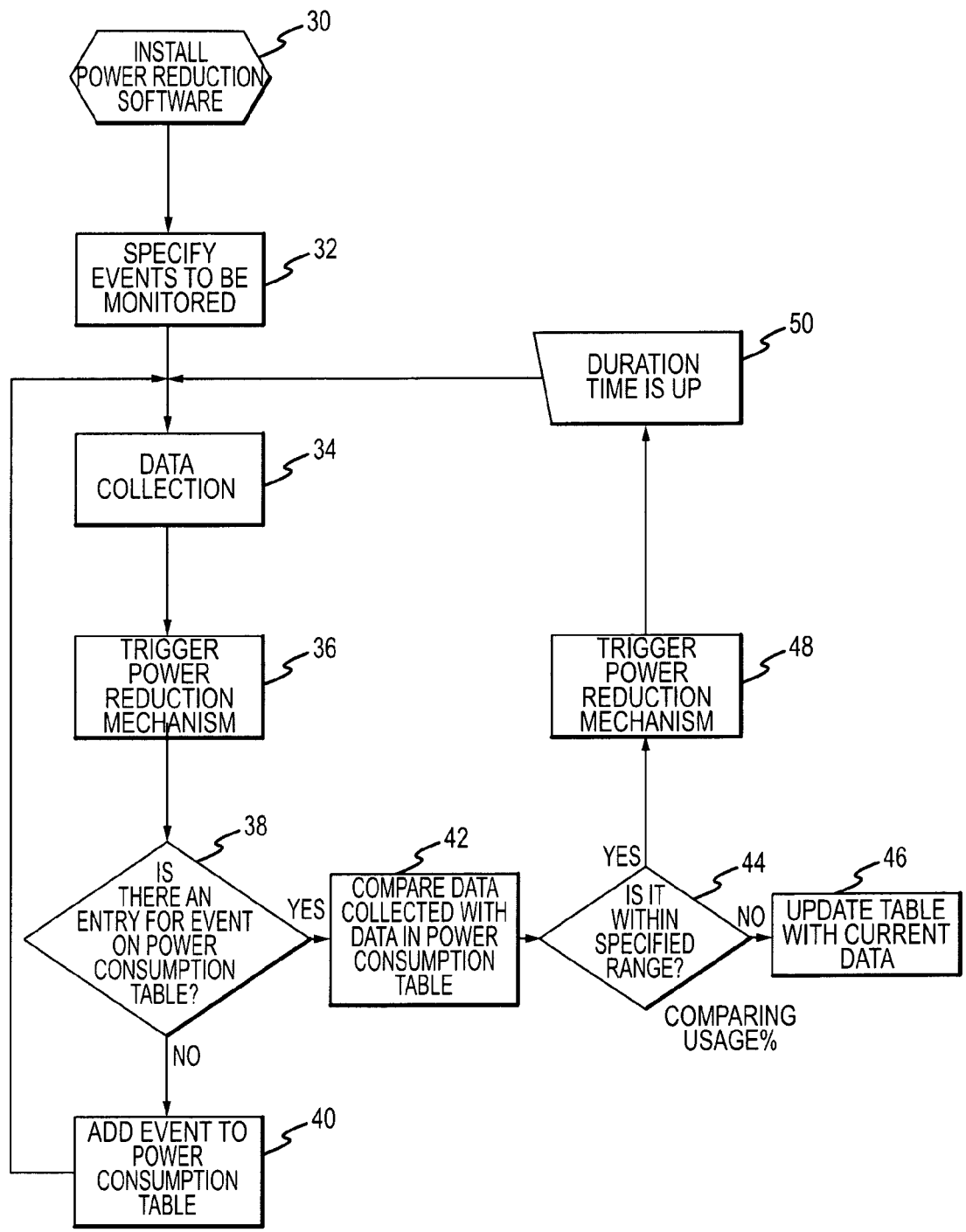
FIG. 2 depicts an exemplary method for minimizing power consumption in a computer server.

FIG. 2 depicts an exemplary method of minimizing power consumption in a computer server environment. As one skilled in the art will appreciate, various steps in the method may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

A user may first implement the method by installing power reduction software (step 30) on a relevant controlling component, such as controller 12 (FIG. 1). As part of the initial setup of the software, a user may define the various events to be monitored by the system (step 32). Again, these events may include such items as usage percentages for a particular storage environment or processing usages for a particular processing environment. In a networking example, a usage percentage for http connections may be included.

Once the events have been specified, the system begins to collect data (step 34). After a predetermined period of time, the system may begin to analyze the data (step 36). For example, the system may collect data for the aforementioned http connections for intervals of time over a certain time period. The system may determine that the number of http connections is greatest between 9:00 AM and 12:00 PM on Mondays. In this manner, a number of events may be collected and stored.

As a next step, the system may query if a particular event has a related entry in the power consumption table (step 38). For example, in a first iteration as previously described, a user may have specified an http event with information, such as anticipated statistical information, relevant to the http event. Such an http event may have been used to build an initial entry in the power consumption table and stored in the system. When the power reduction software is next executed and as part of step 38, the system may examine the http event data (as part of a variety of collected data) and determine if a relevant entry is found in the power consumption table. If a related entry is not found, the system then adds the event to the table (step 40). If the related entry is found, the system compares the collected event data with the entry data stored in the power consumption table (step 42).

If the compared data (event data with entry data) is not within a specified range (such as a specified usage percentage of http connections for a certain period of time), then the system updates the power consumption table with the current event data (step 46). If the compared data is within the specified range, the system triggers an appropriate power reduction mechanism (step 48). The power reduction mechanism continues to operate for a predetermined duration of time stored in the power consumption table (step 50). Once the power reduction mechanism concludes, the system returns to data collection activities (again, step 34).

The power reduction mechanism, as previously described, may implement one or more operational changes to the computer environment, such as reducing processor speed, bringing storage devices on or off line, and the like. In this way, the power reduction mechanism may adjust the collective power consumption of the environment as a whole by regulating power consumption of each computer server (such as a processor blade) of the environment.

Consider the following example of a web server application. Aspects of the exemplary method depicted in FIG. 2 may be used to reduce power consumption of a web server during non-peak times. If a certain web server typically receives a number of hits (http connections) between the hours of 8:00 AM and 10:00 PM, but very few hits between 10:00 PM and 8:00 AM, power reduction software may be configured to collect data about the number of hits received at various times and days. The power reduction software may adjust the power consumption of the web server (and/or power additional web servers up or down) to allow sufficient processing power during peak times but save power during times when few hits are predicted based on the historical data. In this case, the data that would be collected might be the number of http connections per minute or second.

As another example, consider an accounting application used by a small company. Such an accounting application is used heavily during the last 2 days of each month as people submit their monthly accounting information, but is lightly used at other times. The power reduction software would monitor the usage of the accounting application. Based on a constructed power consumption table updated by collected data, the power reduction software powers up additional servers and/or increases clock speed only during the last 2 days of each month when heavy usage is predicted. At other times, some servers would be powered down or their speed reduced in order to reduce power consumption. In this case, the data that would be analyzed might be the CPU utilization or the number of remote connections to the application.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for minimizing power consumption in a computer server, comprising:
   specifying an event to be monitored;
   collecting data for the event to determine if the event occurs;
   comparing collected data for the event with at least one of a plurality of entries that are associated with the event in the power consumption table;

wherein if each of the at least one of the plurality of entries that are associated with the event are not found in the power consumption table;
automatically adding each of the at least one of the plurality of entries that are associated with the event in the power consumption table; otherwise:
triggering a power reduction mechanism if the collected data and the at least one of the plurality of entries are within a specified range; and
updating the power consumption table with the collected data if the collected data and the at least one of the plurality of entries are not within the specified range.

2. The method of claim 1, further including continuing to execute the power reduction mechanism for a specified duration time stored in the power consumption table.

3. The method of claim 1, wherein adding the event as a new one of the at least one of the plurality of entries in the power consumption table includes adding a start time, an end time, a usage percentage, or a duration.

4. The method of claim 1, wherein triggering the power reduction mechanism includes adjusting the collective power consumption of a plurality of computer servers.

5. The method of claim 4, wherein adjusting the collective power consumption of the plurality of computer servers includes powering down or reducing a processing speed of at least one of the plurality of computer servers.

6. The method of claim 1, further including specifying a plurality of types of the event to be monitored for performing the comparing.

7. The method of claim 1, further including implementing a plurality of operational changes for the minimizing power consumption by the power reduction mechanism.

8. A system for minimizing power consumption in a computer server, comprising:
a controller operable on the computer server, the controller configured to:
specifying an event to be monitored;
collecting data for the event to determine if the event occurs,
comparing collected data for the event with at least one of a plurality of entries that are associated with the event in the power consumption table;
wherein if each of the at least one of the plurality of entries that are associated with the event are not found in the power consumption table;
automatically adding each of the at least one of the plurality of entries that are associated with the event in the power consumption table; otherwise:
triggering a power reduction mechanism if the collected data and the at least one of the plurality of entries are within a specified range, and
updating the power consumption table with the collected data if the collected data and the at least one of the plurality of entries are not within the specified range.

9. The system of claim 8, wherein the controller is further configured to execute the power reduction mechanism for a specified duration time stored in the power consumption table.

10. The system of claim 8, wherein the event is a start time, an end time, a usage percentage, or a duration time.

11. The system of claim 8, wherein the controller is further configured to adjust the collective power consumption of a plurality of computer servers pursuant to the power reduction mechanism.

12. The system of claim 11, wherein the power reduction mechanism powers down or reduces a processing speed of at least one of the plurality of computer servers to adjust the collective power consumption.

13. The system of claim 8, wherein the controller is further configured to specify a plurality of types of the event to be monitored for performing the comparing.

14. The system of claim 8, wherein the controller is further configured to implement a plurality of operational changes for the minimizing power consumption by the power reduction mechanism.

15. A computer program product for minimizing power consumption in a computer server, the computer program product comprising a non-transitory computer-readable storage medium having computer-readable program code portions stored therein, the computer-readable program code portions comprising:
a first executable portion for specifying an event to be monitored;
a second executable portion for collecting data for the event to determine if the event occurs;
a third executable portion for comparing collected data for the event with at least one of a plurality of entries that are associated with the event in the power consumption table;
wherein if each of the at least one of the plurality of entries that are associated with the event are not found in the power consumption table;
a fourth executable portion for automatically adding each of the at least one of the plurality of entries that are associated with the event in the power consumption table; otherwise:
a fifth executable portion for triggering a power reduction mechanism if the collected data and the at least one of the plurality of entries are within a specified range; and
a sixth executable portion for updating the power consumption table with the collected data if the collected data and the at least one of the plurality of entries are not within the specified range.

16. The computer program product of claim 15, further including a sixth executable portion for continuing to execute the power reduction mechanism for a specified duration time stored in the power consumption table.

17. The computer program product of claim 15, wherein the event is a start time, an end time, a usage percentage, or a duration.

18. The computer program product of claim 15, wherein the power reduction mechanism adjusts the collective power consumption of a plurality of computer servers.

19. The computer program product of claim 18, wherein the power reduction mechanism adjusts the collective power consumption of the plurality of computer servers by powering down or reducing a processing speed of at least one of the plurality of computer servers.

20. The computer program product of claim 15, further including a sixth executable portion for specifying a plurality of types of the event to be monitored for performing the comparing.

21. The computer program product of claim 15, further including a sixth executable portion for implementing a plurality of operational changes for the minimizing power consumption by the power reduction mechanism.

* * * * *